UNITED STATES PATENT OFFICE.

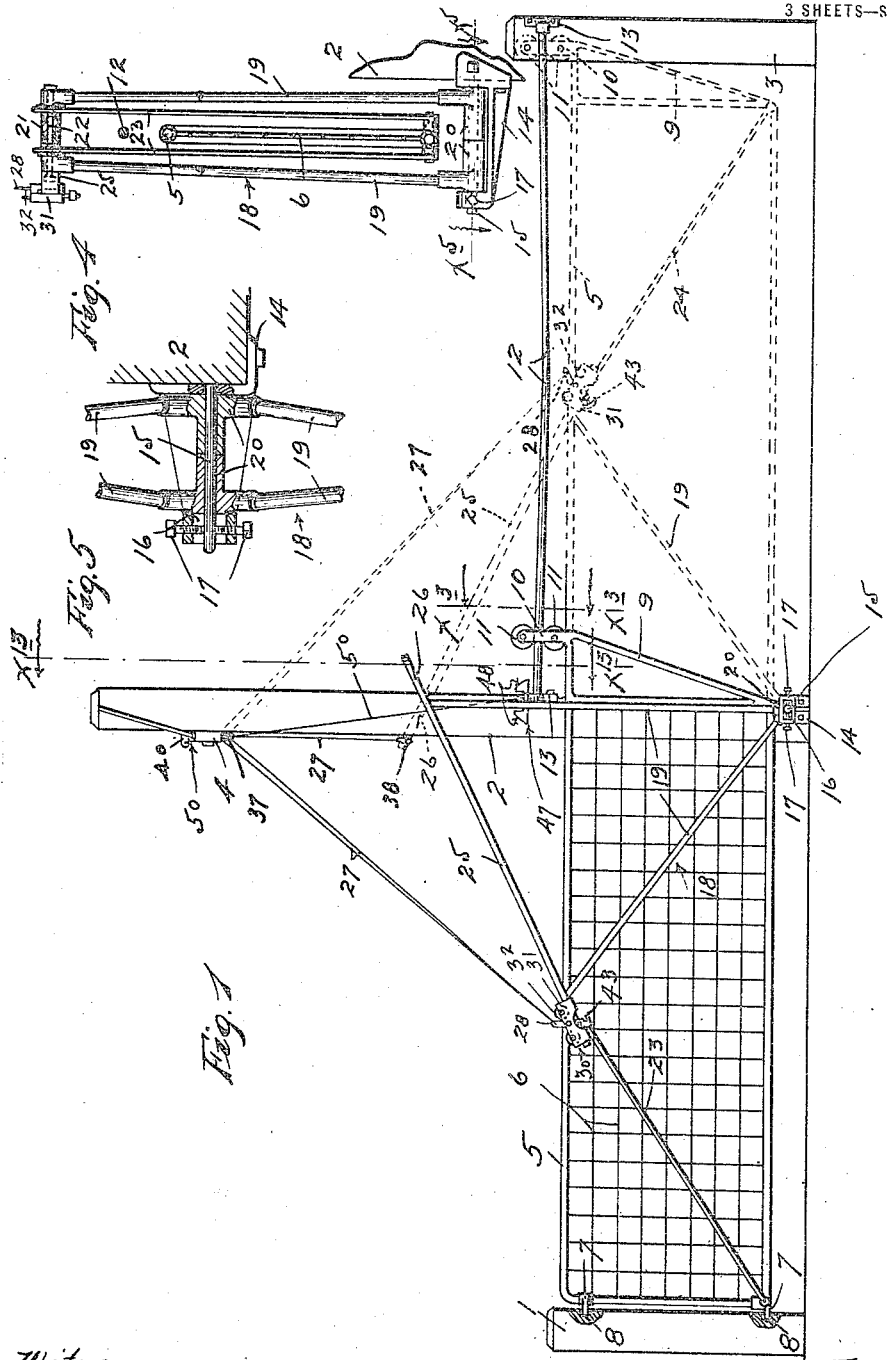

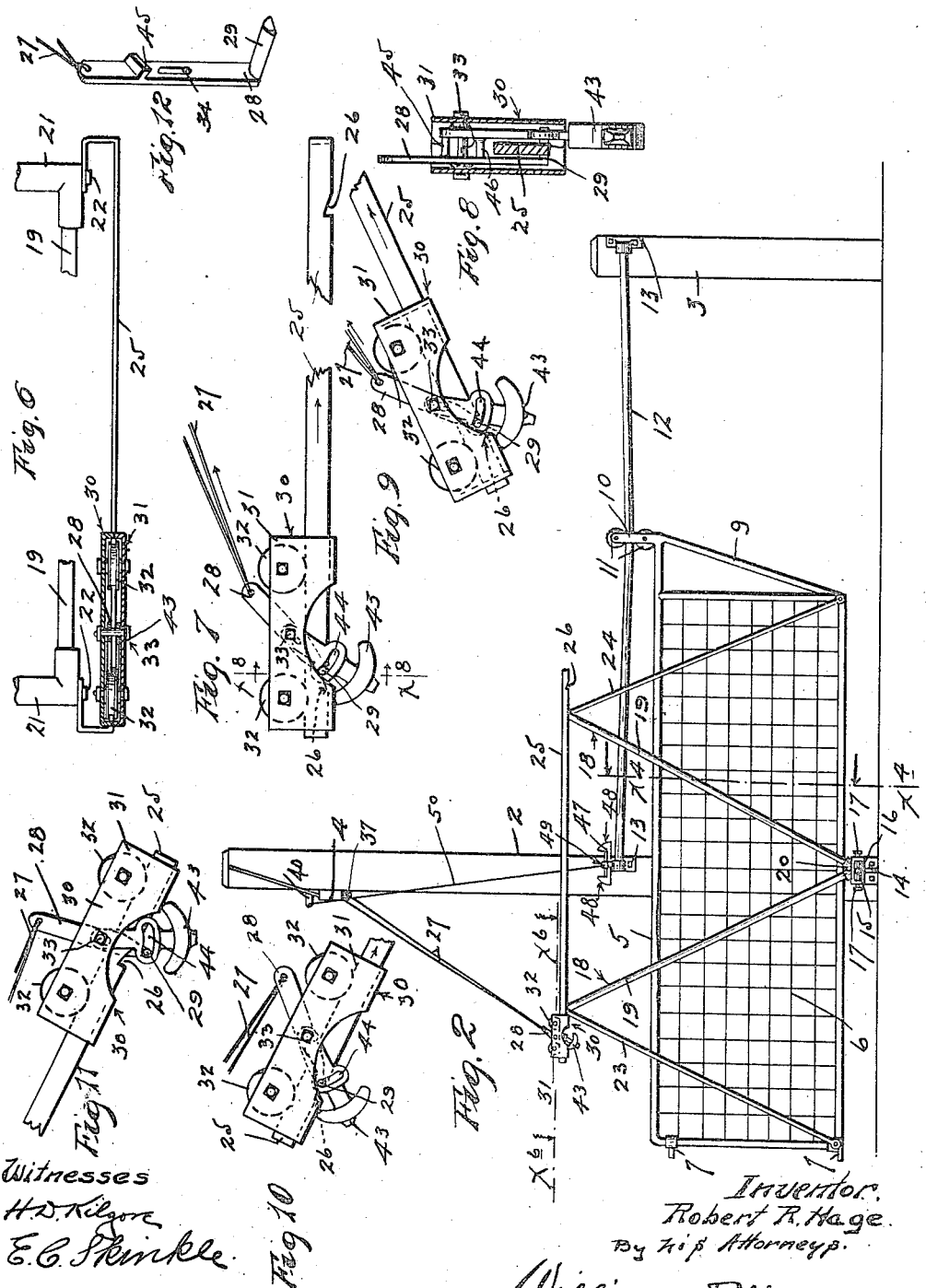

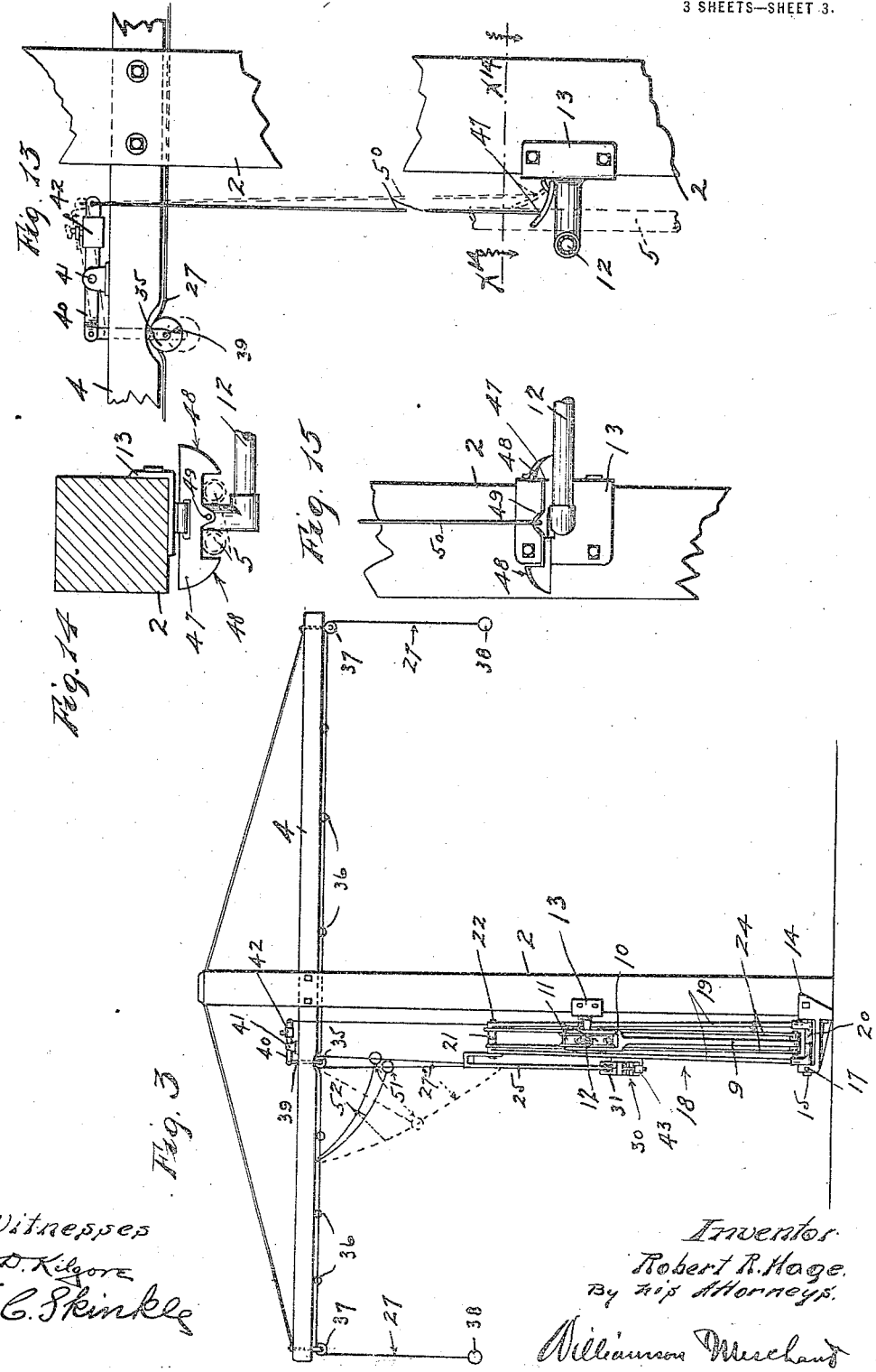

ROBERT R. HAGE, OF GREAT FALLS, MONTANA.

GATE-ACTUATING MECHANISM.

1,214,913.   Specification of Letters Patent.   Patented Feb. 6, 1917.

Application filed December 10, 1915. Serial No. 66,098.

*To all whom it may concern:*

Be it known that I, ROBERT R. HAGE, a citizen of the United States, residing at Great Falls, in the county of Cascade and State of Montana, have invented certain new and useful Improvements in Gate-Actuating Mechanism; and I do hereby declare the following to be a full, clear, and exact description of the invention, such as will enable others skilled in the art to which it appertains to make and use the same.

My present invention relates to gate actuating devices and is in the nature of an improvement on or a modification of my U. S. Letters Patent #908,563 issued of date January 5th, 1909 and entitled "Gate actuating mechanism."

To the above end, the invention consists of the novel devices and combinations of devices hereinafter described and defined in the claims.

In the accompanying drawings, which illustrate the invention, like characters indicate like parts throughout the several views.

Referring to the drawings:

Figure 1 is a side elevation of the invention with the gate shown, by means of full lines, in a closed position, and by means of broken lines, in an open position;

Fig. 2 shows the gate in an intermediate position and moving to an open position;

Fig. 3 is a view principally in rear elevation with some parts sectioned on the line $x^3$ $x^3$ of Fig. 1;

Fig. 4 is a transverse vertical section taken on the line $x^4$ $x^4$ of Fig. 2, on an enlarged scale;

Fig. 5 is a fragmentary detail view with some parts sectioned on the line $x^5$ $x^5$ of Fig. 4, on an enlarged scale;

Fig. 6 is a fragmentary view partly in plan and partly in horizontal section taken on the line $x^6$ $x^6$ of Fig. 2, on an enlarged scale;

Fig. 7 is a side elevation of the parts shown in Fig. 6;

Fig. 8 is a transverse vertical section taken on the line $x^8$ $x^8$ of Fig. 7, on an enlarged scale;

Fig. 9 is a fragmentary detail view, on an enlarged scale showing the carriage and track rail in position, as illustrated by full lines in Fig. 1;

Fig. 10 is a view corresponding to Fig. 9, but showing the parts as illustrated by broken lines in Fig. 1;

Fig. 11 is a view corresponding to Fig. 7, but showing the parts moved a step farther in the opening movement of the gate and the pendulum in position to trip the lock lever out of engagement with the track rail;

Fig. 12 is a perspective view of the lock lever;

Fig. 13 is a fragmentary detail view of the parts located in the vicinity of the line $x^{13}$ $x^{13}$ of Fig. 1 with some parts sectioned on said line;

Fig. 14 is a horizontal section taken on the line $x^{14}$ $x^{14}$ of Fig. 13; and Fig. 15 is a front elevation of the parts shown in Fig. 14.

The numerals 1, 2 and 3 indicate substantially alined front, intermediate and rear gate posts, the two former of which are located, one on each side of a driveway. The gate posts 1 and 3 are of substantially the same height and the gate post 2 is considerably higher than either thereof. To the upper end of the gate post 2, is rigidly bolted a cross arm 4, which extends substantially parallel to the driveway.

The gate, as shown, comprises a rectangular tubular frame 5 and a woven wire panel 6 secured therein. Said gate is mounted to move endwise to and from a closed position and, when closed, extends across the driveway between the gate posts 1 and 2 and, when open, extends between the gate posts 2 and 3. Secured to the front upright of the gate frame 5 is a pair of vertically spaced lugs 7, arranged to enter seats 8 in the gate post 1 for holding the front end of the gate, when closed, against lateral swinging movement. These lugs 7 also assist in supporting the front end of the gate, when closed, and hold the same against straight line lifting movement.

The upper horizontal member of the gate frame 5 is extended outward of the rear end of the gate, is supported by a brace 9 and has rigidly secured thereto, a pair of laterally spaced upwardly projecting arms 10. A pair of flanged guide wheels 11 is journaled between the arms 10. These guide wheels 11 are arranged to run, one upon the upper surface and the other upon the lower surface of a guide rail 12 which extends longitudinally between and at one side of the gate posts 2 and 3. The ends of this guide rail 12 are secured by brackets 13 to said gate posts 2 and 3. It is important to note that the guide rail 12 has a sag at its intermediate portion which extends from the ends thereof. The guide wheels 11, not only guide the gate for straight endwise movement to and from a closed position, but hold the same against lifting movement.

Bolted to the gate post 2, directly under the gate and close to the ground, is a U-shaped bracket 14 having mounted in the prongs thereof, a horizontal pivot pin 15 which extends transversely under said gate. The outer prong of the bracket 14 is provided with a horizontal slot 16 to receive the outer end of the pivot pin 15. Opposing set screws 17 have screw threaded engagement with the bracket 14, extend into the slot 16 and engage the pivot pin 15 for holding the same in different angular adjustments, transversely of the gate. The importance of this adjustment will presently appear.

The lower end of a V-shaped frame 18, for supporting the gate, is mounted on the pivot pin 15 for oscillatory movement, from one side to the other of a dead center, longitudinally of the gate. This gate supporting frame 18 comprises a pair of upwardly converging V-shaped sections 19 located, one on each side of the gate. The lower end of the frame 18 is in the form of a two part casting 20 having alined holes for receiving the pivot pin 15. When the parts of the casting 20 are assembled, they closely fit between the prongs of the bracket 14 and hold the two frame sections 19 against lateral separation at their lower ends. The free ends of corresponding arms of each frame section 19 are connected above the gate by a two-part casting 21. The members of each casting 21 at their abutting surfaces have interlocking engagement against lateral movement and are provided with alined holes to receive a draw bolt 22. These draw bolts 22 hold the upper portions of the frame sections 19 against lateral separation.

The front end of the gate is supported from the frame 18 by a pair of links 23, located, one on each side of the gate. These links 23 are pivotally secured, at one of their ends, to the members of the casting 21 at the front of the gate and their other ends are pivotally secured to the lower front corner of the gate. Likewise the rear end of the gate is pivotally supported from the frame 18 by a pair of links 24. These links are pivotally mounted on the members of the casting 21 at the rear of the gate and to the rear lower end corner of the gate. Obviously, the frame 18 and links 23 and 24 carry the gate in substantially a true horizontal position to and from a closed position.

The free ends of the frame 18 are connected by a track rail 25 in the form of a flat bar which also acts as a brace for said frame. The ends of this track rail 25 extend beyond the frame 18, are bent upon themselves and secured to said frame by the bolts 22, as best shown in Fig. 6. Formed in the lower longitudinal edge of the track rail 25, near each end thereof, is a ratchet tooth 26. These ratchet teeth 26 are reversely formed and extend toward the intermediate portion of the track rail 25.

The gate is moved to and from a closed position by a pair of reversely extended cables 27, each of which is attached, at one end, to a traveling lock lever 28. This lock lever 28 is provided with a laterally projecting lock lug or dog 29 arranged for alternate interlocking engagement with the two ratchet teeth 26. A carriage 30 is provided for carrying the lock lever 28 from one tooth 26 to the other. This carriage 30 comprises a rectangular two-part casing 31 and a pair of flanged wheels 32. The casing 31 is open at its top and bottom and has in its ends, a pair of alined apertures through which the track rail 25 projects. The wheels 32 are arranged in tandem and journaled in the casing 31 to run upon the track 25. A nut equipped bolt 33, passed transversely through the casing 31 between the wheels 32, holds the sections of said casing assembled around the track rail 25.

The lock lever 28 extends vertically through the casing 31 between the wheels 32 and at one side of the track rail 25 with its dog 29 extending under said track rail, as best shown in Fig. 8. In the intermediate portion of the lock lever 28 is a longitudinal extended slot 34 through which the lock bolt 33 projects and affords a fulcrum for said lock lever and permits a slight longitudinal movement thereof in the casing 31.

From the lock lever 28 the cables 27 extend substantially parallel to a pair of guide sheaves 35, from thence, they extend, in reverse directions, over said guide sheaves and through a plurality of rings or eyes 36 suspended from the under side of the cross arm 4. At each end of the cross arm 4, the respective cable 27 runs over a guide sheave 37 and has secured to its free depending end, a hand ring 38 by which the cable is operated. The guide sheaves 35 are journaled on the lower end of the link 39 which extends vertically through an aperture in the cross arm 4 at one side of the post 2. This link 39 is pivotally suspended from the short end of a lever 40 intermediately fulcrumed on a bracket 41, rigidly secured to the top of a cross arm 4. A weight 42 on the long end of the lever 40 normally holds said lever in a position to elevate the sheaves 35.

A tripping pendulum 43 is provided for releasing the lock dog 29 from the engaged ratchet tooth 26, when the lock lever 28 is released by the held cable 27. This tripping pendulum 43 is pivotally suspended from the bolt 33 on the opposite side of the track rail 25 from the lock lever 28 and is provided at its intermediate portion with a transverse slot 44 into which the dog 29 projects. The lock lever 28 and tripping pendulum 43 are held laterally spaced and out of contact with the track rail 25 by a boss 45 on the lock lever 28 and a boss 46 on said pendulum. The boss 45 is located above the pivot 33 and the boss 46 is located below the same, see Fig. 8.

The gate is locked, both in an open and a closed position, by a yoke-like latch 47 pivoted at its intermediate portion to the bracket 13 on the gate post 2 for vertical swinging movement and arranged to embrace one of the uprights of the inner frame section 19 to lock the gate closed and to embrace the other thereof to lock the gate open. The outer edges of the prongs of the latch 47 are beveled to afford cam surfaces 48 with which the uprights of the inner frame section 19 engage to lift the latch, as shown by dotted lines in Fig. 15, and to permit said uprights to pass into interlocking engagement with said latch. After one of the uprights of said frame section have passed the engaged prong of the latch 47, said latch will return to an operative position under the action of gravity. Extending between the prongs of the latch 47, is a perforated ear 49 pivotally connected to the long or weighted end of the lever 40 by a rod 50. Each of the cables 27 is extended through a weighted ring 51 suspended from the cross arm 4 by a cable 52. The purpose of these weighted rings 51 is to take the slack out of the cables 27.

When the gate is closed, as shown in Fig. 1, the track rail 25 stands in an oblique position and the carriage, under the action of gravity, moves the lowermost portion of said rail and is stopped by the laterally bent end thereof. By pulling on either one of the hands rings 38, when the carriage 30 is in the position illustrated in Fig. 1, the lock lever 28 is rocked by the respective cable 27 on the pivot 33 and its lock dog 29 is carried into interlocking engagement with the adjacent ratchet tooth 26. With the lock dog 29 interlocked to the track rail 25, a continued pull on said cable will rock the gate supporting frame 18 on its pivot 15 and move the gate endwise, toward an open position. When the gate is half-way open, the track rail 25 is in a horizontal position and a further continued pull on said cable will move the gate supporting frame 18 beyond a dead center and the further opening movement of the gate is imparted under the action of gravity and momentum. During the initial pull on said cable 27, the guide sheaves 35 are pulled down thereby, which operation rocks the lever 40 and lifts the latch 47 by the connection 50, as shown by broken lines in Fig. 13.

When the gate is at an intermediate position, the lock lever is in a position, as shown in Fig. 7, and the tripping pendulum 43 is lifted out of a vertical position by the lock dog 29 in the slot 44 and tends to rock said lock lever into a vertical or substantially vertical position. After the gate supporting frame 18 has moved past a dead center, the tripping pendulum 43 still tends to rock the lock lever 28 into an upright position. When the cable 27, by which the gate is being moved, is released, or, as slack is produced in said cable by the elevation of the carriage 30 as the gate supporting frame 18 moves past a dead center, the tripping pendulum 43 becomes effective. Under the action of the effective tripping pendulum 43, the lock lever 28 is rocked into an upright position which carries the lock dog 29 out of engagement with the respective ratchet tooth 26. With the lock dog 29 released from the track rail 25, the carriage 30, under the action of gravity, travels to the opposite end of said track rail and is stopped by the laterally bent end thereof. In this position of the carriage 30 the lock dog 29 is in a position to be moved into interlocking engagement with the adjacent ratchet tooth 26 when one of the cables 27 is pulled, as previously described. The closing of the gate is effected in the same manner as the opening thereof.

By adjusting the set screws 17, the bracket 14, and hence, the gate carried thereby, may be set in different horizontal angular positions for alining the gate in respect to the rail 12.

What I claim is:—

1. The combination with a gate, of a pivoted support for the gate, mounted to move from one side to the other of a dead center, a lock mounted on the gate support above its pivot and adapted to be secured thereto at the limit of its travel in either direction, and means for rendering the lock operative and for moving the gate support from one side to the other of a dead center.

2. The combination with a gate, of a pivoted support for the gate, mounted to move from one side to the other of a dead center, a lock mounted on the gate support above its pivot for bodily traveling movement under the action of gravity and to be secured thereto at the limit of its travel in either direction, and means for rendering the lock operative and for moving the gate support from one side to the other of a dead center.

3. The combination with a gate, of a pivoted support for the gate, mounted to travel from one side to the other of a dead center and having a track rail above its pivot, the angularity of which is changed by the movement of the gate support, a lock mounted on the track rail for bodily traveling movement under the action of gravity and to be secured thereto at the limit of its travel in either direction, and means for rendering the lock operative and for moving the gate support from one side to the other of a dead center.

4. The combination with a gate support, comprising a pair of upwardly diverging arms and pivoted at its lower end portion for movement from one side to the other of a dead center, of a gate, a pair of links suspending the gate from the arms of the gate support, a track rail connecting said arms, a lock lever mounted on the track rail for bodily traveling movement under the action of gravity and to be secured thereto at the limit of its travel in either direction and a cable attached to the lock lever for operating the same and for moving the gate support from one side to the other of a dead center.

5. The combination with a gate support, comprising a pair of upwardly diverging arms and pivoted at its lower end portion for movement from one side to the other of a dead center, of a gate, a pair of links suspending the gate from the arms of the gate support, a track rail connecting said arms, a lock lever mounted on the track rail under the action of gravity and to be secured thereto at the limit of its travel in either direction, a cable attached to the lock lever for operating the same and for moving the gate support from one side to the other of a dead center, and means for tripping the lock lever when released by the cable.

6. The combination with a gate support, comprising a pair of upwardly diverging arms and pivoted at its lower end portion for movement from one side to the other of a dead center, of a gate, a pair of links suspending the gate from the arms of the gate support, a track rail connecting said arms and having a pair of longitudinally spaced lock seats, a carriage mounted to travel on the track rail under the action of gravity, a lock lever fulcrumed on the carriage and adapted to be interlocked with said lock seats, and a cable attached to the lock lever for moving the same into said lock seats and for moving the gate support from one side to the other of a dead center.

7. The combination with a gate support, comprising a pair of upwardly diverging arms and pivoted at its lower end portion for movement from one side to the other of a dead center, of a gate, a pair of links suspending the gate from the arms of the gate support, a track rail connecting said arms and having a pair of longitudinally spaced lock seats, a carriage mounted to travel on the track rail under the action of gravity, a lock lever fulcrumed on the carriage and adapted to be interlocked with said lock seats, a cable attached to the lock lever for moving the same into said lock seats and for moving the gate support from one side to the other of a dead center, and means for tripping the lock lever out of the engaged lock seat when released by the cable.

8. The combination with a gate support, comprising a pair of upwardly diverging arms and pivoted at its lower end portion for movement from one side to the other of a dead center, of a gate, a pair of links suspending the gate from the arms of the gate support, a track rail connecting said arms and having a pair of longitudinally spaced lock seats, a carriage mounted to travel on the track rail under the action of gravity, a lock lever fulcrumed on the carriage and adapted to be interlocked with said lock seats, a cable attached to the lock lever for moving the same into said lock seats and for moving the gate support from one side to the other of a dead center, and a pendulum for tripping said lock lever out of the engaged lock seat when released by the cable.

9. The combination with a gate support, comprising a pair of upwardly diverging arms and pivoted at its lower end portion for movement from one side to the other of a dead center, of a gate, a pair of links suspending the gate from the arms of the gate support, a stop extending between said arms and with which said arms engage to limit the opening and closing movements of the gate, and a latch in the vicinity of said stops and engageable with one of said arms for securing the gate in a closed position.

10. The combination with a gate support, comprising a pair of upwardly diverging arms and pivoted at its lower end portion for movement from one side to the other of a dead center, of a gate, a pair of links suspending the gate from the arms of the gate support, a stop extending between said arms and with which said arms engage to limit the opening and closing movements of the gate, and a latch in the vicinity of said stop and engageable with the arms of the gate support for securing the gate in open and closed positions.

11. The combination with a gate support, comprising a pair of upwardly diverging arms and pivoted at its lower end portion for movement from one side to the other of a dead center, of a gate, a pair of links suspending the gate from the arms of the gate support, a stop extending between said arms and with which said arms engage to limit the opening and closing movements of the gate, a latch in the vicinity of said stops and engageable with one of said arms for securing the gate in a closed position, means for moving the gate support from one side to the other of a dead center, and a connection for rendering said latch inoperative, said connection being actuated by the means for moving the gate support from one side to the other of a dead center.

12. The combination with a gate support pivoted at its lower portion for movement from one side to the other of a dead center, and means for adjusting the gate support in a horizontal plane, of a gate, a pair of links suspending the gate from the gate support, and means for moving the gate support from one side to the other of a dead center.

13. The combination with a gate support pivoted at its lower portion for movement from one side to the other of a dead center, of a gate, a pair of links suspending the gate from the gate support, a guide rail engageable with a part carried by one end of the gate, said guide rail having a straight gradual incline from both ends toward the center thereof, and means for moving the gate support from one side to the other of a dead center.

In testimony whereof I affix my signature in presence of two witnesses.

ROBERT R. HAGE.

Witnesses:
W. W. HUNTSBERGER,
JOHN W. HUNTSBERGER.

Copies of this patent may be obtained for five cents each, by addressing the "Commissioner of Patents, Washington, D. C."